No. 681,173. Patented Aug. 20, 1901.
H. P. MAXIM & A. F. BARDWELL.
DETACHABLE TRACTION STRAP.
(Application filed Dec. 29, 1897.)
(No Model.)
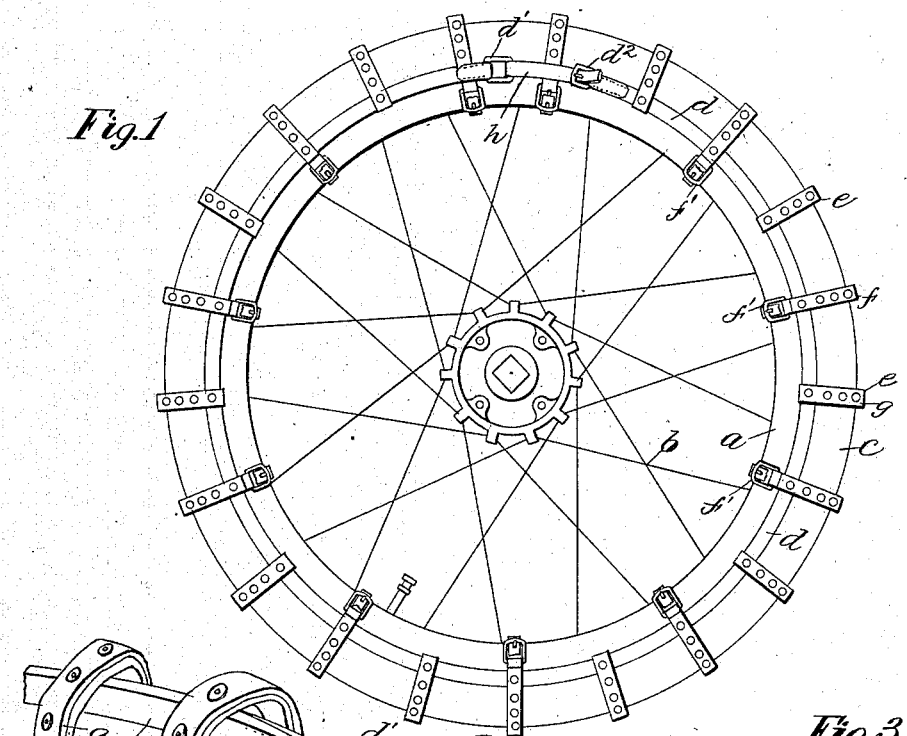
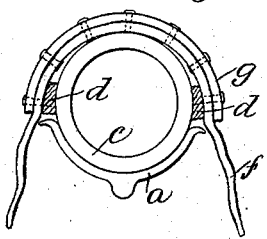
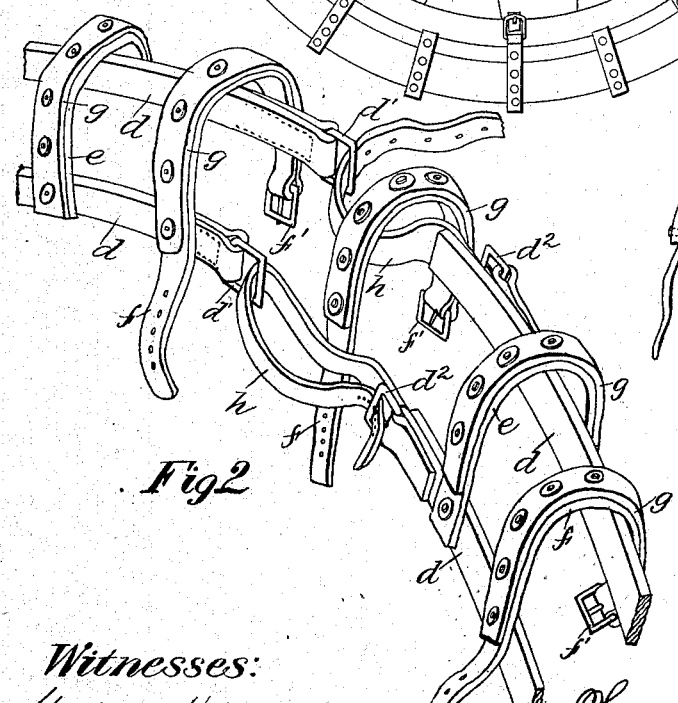
Witnesses:
William H Barker.
Arthur B Jenkins.
Inventors
Hiram P Maxim.
Arthur F Bardwell.
by Chas. L. Burdett
Attorney.

UNITED STATES PATENT OFFICE.

HIRAM PERCY MAXIM AND ARTHUR F. BARDWELL, OF HARTFORD, CONNECTICUT, ASSIGNORS, BY MESNE ASSIGNMENTS, TO THE COLUMBIA AND ELECTRIC VEHICLE COMPANY, OF JERSEY CITY, NEW JERSEY.

DETACHABLE TRACTION-STRAP.

SPECIFICATION forming part of Letters Patent No. 681,173, dated August 20, 1901.

Application filed December 29, 1897. Serial No. 664,176. (No model.)

*To all whom it may concern:*

Be it known that we, HIRAM PERCY MAXIM and ARTHUR F. BARDWELL, citizens of the United States, and residents of Hartford, in the county of Hartford and State of Connecticut, have invented certain new and useful Improvements in Detachable Traction-Straps, of which the following is a full, clear, and exact description, whereby any one skilled in the art can make and use the same.

Our invention relates to the general class of traction devices; and the object of our invention is to produce a device of this class that is especially applicable to vehicles having rubber tires, that shall be simple, strong, and durable, one that shall be thoroughly effective for purposes desired, and one that may be easily secured to or removed from a wheel.

To this end our invention consists in the device as a whole and in the details of construction of parts, as hereinafter described, and more particularly set out in the claims.

Referring to the drawings, Figure 1 is a view in side elevation of a wheel, showing our improved device in place thereon. Fig. 2 is a perspective view of a portion of the device, showing its construction. Fig. 3 is a detail view in cross-section through the rim of a wheel, showing the device in place thereon.

Our invention is designed more especially for use in connection with a rubber-tired wheel, whether of the pneumatic or solid type, and in the accompanying drawings the letter $a$ denotes the wheel-rim, $b$ the spokes, and $c$ the tire, secured in a circumferential groove on the rim.

The device is so constructed as to be readily attached to the wheel or removed therefrom, and consists of lengthwise members $d$, preferably two in number, located at or near each end of cross members $e$. These cross members are secured to the lengthwise members at suitable distances apart, and some of these cross members $f$, as illustrated herein, may be provided with means of attachment $f'$. The cross members, if desired, may be secured to the lengthwise members in such position that the latter shall lie on diametrically opposite sides of the tire $c$, and, as shown herein, secured at their ends to the lengthwise members.

When the members $f$ are provided with fastening means, these are preferably located at the ends of the members, the form herein shown being buckles $f'$, engaging a fastening-strap. These cross members in the preferred form of the invention are secured to the lengthwise members in such manner that the latter shall extend in direction practically parallel with each other. When this means of attachment is employed, the ends of the members provided with fastening means are made of a length sufficient to extend around the tire and rim to a point that will enable them to meet and be secured together, the fastening means $f'$ being secured to some of these ends.

Any means for securing the ends of the lengthwise members together may be employed, the form herein shown consisting of loops $d'$, secured to one end of a lengthwise member, and buckles $d^2$ at the opposite end, a fastening-strap $h$ passing through the loop $d'$ and engaging the buckle $d^2$, securing the parts together.

The cross members may be, as herein shown, provided with spurs $g$, secured thereto in any desired manner and in numbers sufficient to afford the required bite or grip of the wheel upon the surface over which it is being moved, although such parts are not necessary or even essential to the invention.

In the device illustrated and described herein the cross members and lengthwise members are composed of straps of tanned leather; but these parts may be composed of any pliable non-metallic material that will accomplish the desired result, it being understood that those parts of the device designed to come in contact with the surface over which the vehicle is being moved shall be composed of tough pliable material as distinguished from a metallic material.

We do not desire to limit ourselves to the precise construction and arragement shown and described herein, as any traction device the tread of which involves the use of tough pliable material with means for securing the device to the wheel of a vehicle will come within the scope of our invention.

An objection has been found to the use of traction devices composed of metal having yielding or spring qualities from the fact that that part of the device coming in contact with a rubber tire is apt to cut the latter, and such a traction device also injures the road over which a heavy vehicle provided with the device may be moved. These disadvantages are overcome by the use of our improved device in that no injury results to the tread of the wheel nor to the surface of the road over which it is traveling.

We claim as our invention—

1. A detachable traction device including a number of cross members composed of tough pliable material, with means for connecting the several members and means for attachment of the same to a wheel or like part.

2. In a detachable traction device provided with means for attachment to a wheel or like part, lengthwise members and crosswise members connected with each other, that part of the device forming the tread being composed of tough pliable material.

3. In a detachable traction device provided with means for attachment to a wheel or like part, lengthwise members, and crosswise members extending between the lengthwise members, secured thereto, and composed of tough pliable material.

HIRAM PERCY MAXIM.
ARTHUR F. BARDWELL.

Witnesses:
FELTON PARKER,
HENRY J. HILL.